Nov. 4, 1952     T. A. TARR     2,616,653
POSITIVE SHUTOFF VALVE
Filed Sept. 15, 1947
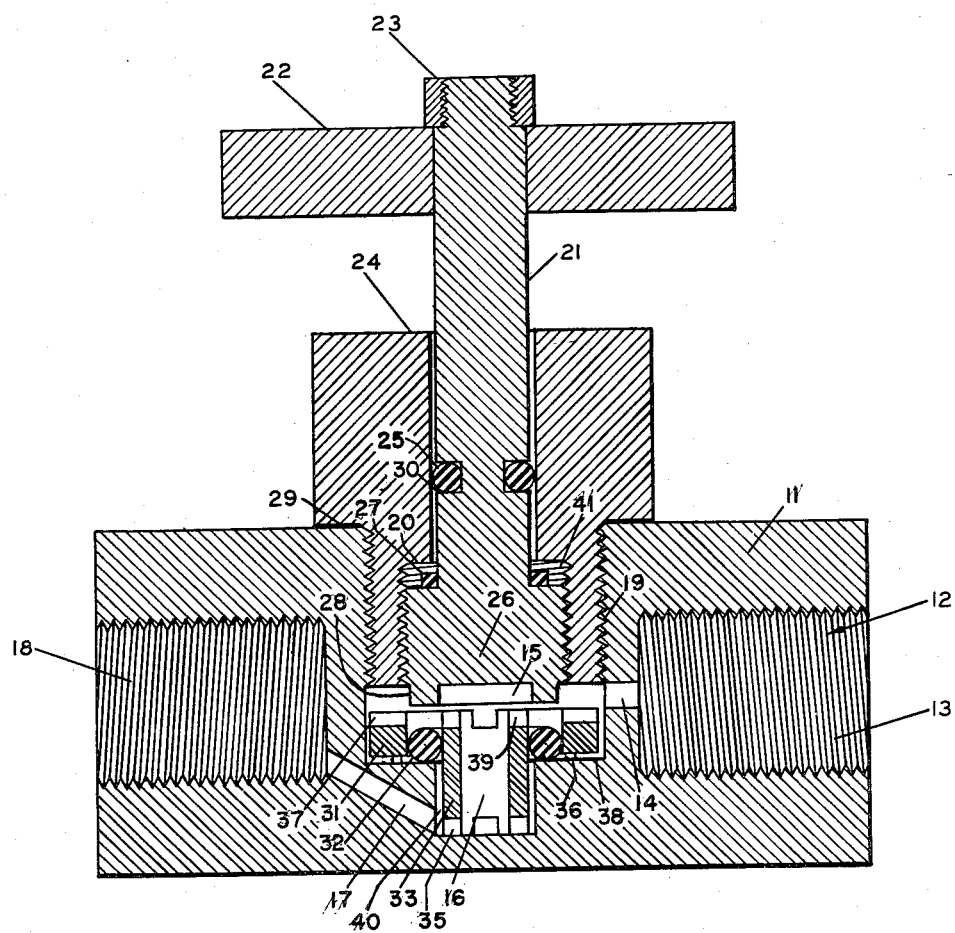
INVENTOR.
T. A. TARR
BY Hudson & Young
ATTORNEYS Patented Nov. 4, 1952

2,616,653

UNITED STATES PATENT OFFICE 2,616,653

POSITIVE SHUTOFF VALVE

Tom A. Tarr, Bartlesville, Okla., assignor to Phillips Petroleum Company, a corporation of Delaware Application September 15, 1947, Serial No. 774,044

4 Claims. (Cl. 251—27)

This invention relates to valves. In one of its more specific aspects it relates to valves of the positive shut-off type for control of flow of fluid at high pressures or at very low pressures from either direction.

In conventional valves, or especially in valves for controlling flow of high pressure fluids or very low pressure fluids, few types of valves, if any, are positive shut-off against fluid flow from either direction.

An object of my invention is to provide a valve which gives a positive seal against high pressure or against very low pressures. Another object of my invention is to provide a valve of a positive shut-off type which also will control the flow of high pressure or low pressure fluids in either direction. Another object of my invention is to provide a valve which may be opened or closed with a very short distance of plunger travel.

These and other objects will be realized by those skilled in the art from a study of the following disclosure taken in conjunction with the attached drawing which respectively describes and illustrates one embodiment of my invention.

The figure is a longitudinal sectional view of the valve of my invention.

Referring now to the drawing, my valve is composed of a valve body 11 through which is a conduit generally referred to by numeral 12. This conduit 12 is composed of several sections, namely sections 13, 14, 15, 16, 17 and 18. Sections 13 and 18 are provided with internal threads for attaching to pipes.

In the figure a valve stem 21 has on its bottom a plunger 26, which plunger terminates with a compressive ring member 28. The upper end of the valve stem may be shouldered and threaded to accommodate a valve handle 22 and a nut 23. The valve stem and plunger assembly is held in place in the valve body by a gland nut member 24. A gasket 29 is placed between the gland nut 24 and the valve body 11 to prevent leakage of fluid through the threaded section 19. A resilient O-ring 25 in groove 30 in the valve stem 21 serves to seal the annular space between the valve stem 21 and the gland nut against leakage of fluid. A resilient ring member 27 is inserted between the top of the valve plunger 26 and the underside 20 of the gland nut 24 so that the valve plunger will not jam against the surface 20 when the valve is fully opened. A ring member 31 is placed upon a seat 38 of the valve. The main portion of the ring is held off the seat a short distance by the small raised portion 36. The upper surface of the ring 31 has a plurality of radial grooves or channels 37 to assist the flow of fluid when the compression ring member 28 is raised only a slight extent.

Directly under the compressive ring member 28 is an O-ring member 32. This O-ring, as well as the O-ring 25, is made of a resilient material such as rubber.

Inside this O-ring 32 is inserted a hollow pin member 33. The longitudinal axis of this hollow pin member coincides substantially with the axis of the valve stem 21. The outer diameter of this hollow pin is slightly smaller than the inner diameter of the compressive ring member 28 so that the compression ring 28 may move downwardly around the upper end of the hollow pin without touching or binding, and so that the compressive ring member might be raised without lifting the hollow pin.

The hollow pin 33 has bottom channels or grooves 35. The upper end of the hollow pin member is also provided with grooves 39.

This hollow pin member rests in a hole extending from the bottom of the valve seat 38 downward some distance. The bottom of this hole 40 is connected with the conduit section 17 while the upper portion of this hole 40 opens into the conduit section 15.

The valve plunger 26 is threaded to fit the inside threads 41 of the gland nut 24, and it is these threads which cause the raising or lowering of the valve plunger 26 upon rotation of the valve handle 22. In one valve which I have made, the threads 41 were rather fine threads, there being 16 threads to the inch. In opening or closing such a valve with 16 threads to the inch at 41, I have found that turning the handle 22 one-sixth of a turn from an open position closes the valve or conversely from a closed position, opens the valve. When the valve is in an open position, the resilient member 27 assists the O-ring 25 in sealing the area around the valve stem against leakage of fluid. When the valve is closed, the O-ring 25 assumes this entire sealing load and I have found that with a well-fitted O-ring 25 this one ring makes an efficient seal.

When the valve is opened and fluid is flowing from left to right, fluid enters the valve body through conduit member 18, passes through conduit member 17 and passes through the grooves 35 of the hollow pin 33 into the center conduit section 16 and thence into the conduit section 15 directly under the valve plunger 26. From the conduit section 15 the fluid then passes under the compressive ring member 28 and toward the right through channel 14 into the outlet conduit section 13.

When fluid flows from right to left it passes from conduit section 13 through channel 14 on top of the collar member 31 under the compressive ring 28, through space 15 and grooves 39 into the vertical channel 16 of the pin 33, then through the grooves 35 of the pin and through the channel 17 into the outlet section 18.

When the valve plunger 26 is lowered toward its closed position, the bottom surface of the compressive ring member 28 approaches the O-ring member 32. When high pressure gas is flowing in either direction, as the valve plunger 26 approaches the O-ring member 32, this member is deformed in a downstream direction and the valve becomes closed. When low pressure gas is flowing in either direction, the valve plunger touches and very slightly deforms the O-ring to initiate its deformation and effect the seal.

When the valve is closed, the greater the pressure drop across the seal the tighter is the seal against the flow of fluid from either direction. In explanation of this point, high fluid pressure from conduit section 18, for example, is transmitted through conduit section 17 and through section 16, into the conduit section 15. Under these conditions, of course pressure on the downstream side or in conduit sections 13 and 14 is lower than the pressure on the upstream side and the O-ring 32 is further deformed from its high pressure side toward its low pressure side to make a completely fluid tight seal between the O-ring member 32, the valve seat 38, the ring member 31, and the bottom surface of the compressive ring member 28. In this manner fluid tending to flow from the left to right is completely closed off.

Pressure is also placed upon the lower portion of ring 32 due to the communication of conduit 17 with the interspace at 40 between annular member 33 and the valve body, this interspace, in turn, communicating with the lower portion of the ring 32. As a result, the ring 32 is stressed and assumes an elliptical shape so as to seal the region at 32 between the ring and annular member 31 as well as the region between the flange 28 and annular member 31. The upward pressure exerted on the ring through the interspace 40 and the downward pressure exerted thereon through the region 15 are so balanced that there is no tendency for the ring to move upwardly or jam as the plunger 26 is raised to open the valve.

When fluid is flowing from conduit section 13 toward conduit section 18, or from right to left and the valve 26 is closed, then the O-ring 32 is pushed tightly against the valve seat 38, against the outer surface of the hollow pin member 33 and against the under surface of the compressive ring member 28 to make the seal against flow of fluid. This sealing pressure consists of a component directed downwardly against the ring through the passage at 38 between the annular member 31 and the valve body. The resultant pressure causes the ring 32 to assume an elliptical configuration and seal the region between annular member 33, the valve seat body as well as the region between annular member 33 and the flange 28. As before, the pressure components are so balanced that there is no tendency for the ring to move upwardly or jam as the plunger 26 is raised to open the valve.

I have found that in addition to sealing off completely the flow of fluid from either direction, that upon opening the valve slightly any relative amount of fluid may be permitted to flow in either direction. In other words, in addition to being a positive shut-off valve, my valve also is a rate of flow control valve. I have used this valve in services up to 600 pounds per square inch pressure and under such pressure conditions when the valve was closed sealing was complete from either left to right or from right to left. The flow of small quantities of fluid was easily controlled by partly closing the valve. My valve may be used for pressures as high as 4,000 pounds, or higher, per square inch or for pressures considerably lower than atmospheric.

It will be obvious to those skilled in the art that various relative dimensions may be changed as desired and to fit particular problems. For example, a smaller or larger number of threads per inch may be used at threads 41 so that the distance of travel of the valve plunger will be greater or less per revolution of the valve handle. Thus, a valve equipped with large threads at 41 will permit flow of larger volumes of fluid per turn of the valve handle than a valve made with low pitch threads.

The size of the conduit section 17 and of the conduit section 14 also effects the flow of fluid under wide open conditions of valve setting. Similarly the size of the opening 16 in the hollow pin member and the size and number of slots 35 and 39 in the pin member 33, effect the flow of fluid. Larger slots, of course, make for a larger capacity valve.

The valve described in detail herein is a straight valve, but the principles I have disclosed may be applied to a right angle or 90° valve as another embodiment. In such a valve, conduits 13, 14, 15 and 16 are similar to those of the figure. The left hand portion of the valve body with its conduit sections 18 and 17 is replaced by a valve body portion extending downward, the axis of which coincides and is an extension of the axis of the valve stem 21 and channel 16. The pin member 33 with its channelled top and bottom may be the same as shown in the drawing. A small vertically disposed channel extends downward from the bottom of conduit section 16 and this channel opens into a larger diameter threaded section corresponding to conduit section 18. A valve of this 90° type operates in exactly the same manner as the straight or 180° valve.

My valve finds special utility in laboratory apparatus where very high fluid pressures, of the order of several thousand pounds per square inch, are encountered. Fluids under such pressures may be entirely closed off from either direction or the flow controlled from either direction.

Materials of construction may for the most part be selected from among those commercially available. The valve body member 11 may be made from cast iron or steel, either ordinary carbon steel or stainless steel as desired. The gland nut member 24 may also be made of any material. This gland nut member 24 should preferably be made with its exterior portion hexagonal in shape, for example, so that it may be tightened or loosened from the valve body with a wrench. The valve stem 21 may be made of rod stock with the valve plunger 27 fastened thereto in any manner desired, for example, the lower end of the valve stem may be threaded and screwed into the plunger and keyed or pinned thereto to prevent separation of the two, or the valve stem-plunger may be turned as an integral unit from a piece of larger diameter stock.

Having disclosed my invention, I claim:
1. A high-pressure fluid shut-off valve comprising, in combination, a valve body having a conduit therethrough, a valve seat in said conduit, an annular resilient packing washer of circular cross-section engaging said seat, a valve head movably mounted in said body disposed in said movement to force said washer against said seat and thereby control the flow of high pressure fluid through said conduit, and inner and outer retaining rings concentrically disposed relative to said washer, said rings being provided with a passage from the interior to exterior thereof adjacent each end thereof, each of said passages being disposed to pass said pressure fluid at all times but said rings being disposed to back-up said washer centrally in the direction of fluid pressure drop.

2. A high-pressure fluid shut-off valve comprising, in combination, a valve body having a conduit therethrough, a valve seat in said conduit, an annular resilient packing washer disposed to engage said seat, a valve head movably mounted in said body disposed in said movement to force said washer against said seat and thereby control the flow of high pressure fluid through said conduit, and inner and outer retaining rings concentrically disposed relative to said washer, said rings being provided with an opening from the interior to the exterior thereof adjacent each end thereof, each of said rings being disposed to pass said pressure fluid at both sides of said washer at all times but to back-up said washer centrally in the direction of fluid pressure drop.

3. A high pressure fluid shut-off valve comprising, in combination, a valve body having a conduit therethrough, a valve seat in said conduit, an annular resilient packing washer of circular cross-section disposed to engage said seat, a valve head movably mounted in said body disposed in said movement to force said washer against said seat and thereby control the flow of high pressure fluid through said conduit, and inner and outer retaining rings concentrically disposed relative to said washer, said rings being disposed to pass said pressure fluid at both sides of said washer at all times but to back-up said washer centrally in the direction of fluid pressure drop.

4. A high-pressure fluid shut-off valve comprising, in combination, a valve body having a conduit therethrough, a valve seat in said conduit, an annular resilient packing washer disposed to engage said seat, a valve head movably mounted in said body disposed in said movement to force said washer against said seat and thereby control the flow of high pressure fluid through said conduit, and inner and outer retaining rings concentrically disposed relative to said washer, said rings being disposed to pass said pressure fluid at both sides of said washer at all times but to back-up said washer centrally in the direction of fluid pressure drop.

TOM A. TARR.

REFERENCES CITED

The following references are of record in the file of this patent:

UNITED STATES PATENTS

| Number | Name | Date |
| --- | --- | --- |
| 449,161 | Lacy | Mar. 31, 1891 |
| 717,990 | Harvey | Jan. 6, 1903 |
| 1,372,244 | Paske | Mar. 22, 1921 |
| 1,667,580 | Albrecht | Apr. 24, 1928 |
| 2,136,835 | Begg | Nov. 15, 1938 |
| 2,252,923 | Granetz | Aug. 19, 1941 |

FOREIGN PATENTS

| Number | Country | Date |
| --- | --- | --- |
| 12,911 | Great Britain | of 1904 |